J. H. YARBROUGH.
BAGGAGE TRUCK.
APPLICATION FILED DEC. 5, 1916.
1,257,169.
Patented Feb. 19, 1918.
3 SHEETS—SHEET 1.
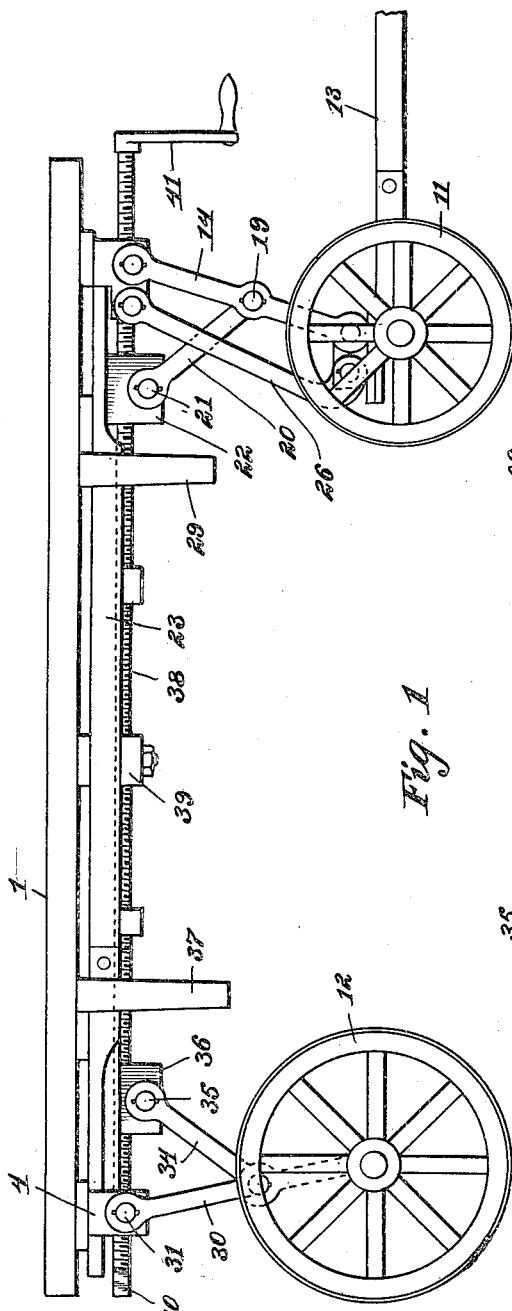
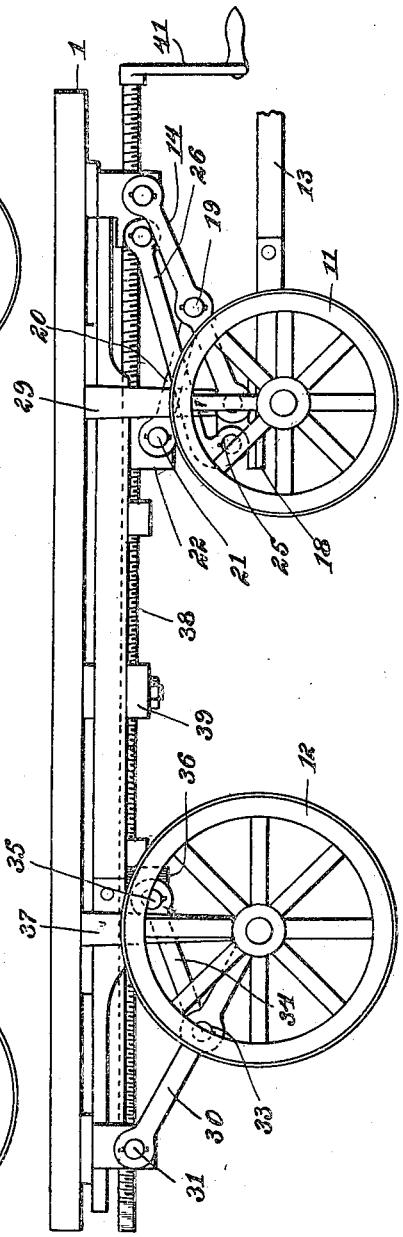
WITNESSES
INVENTOR
John H. Yarbrough,
BY Victor J. Evans
ATTORNEY

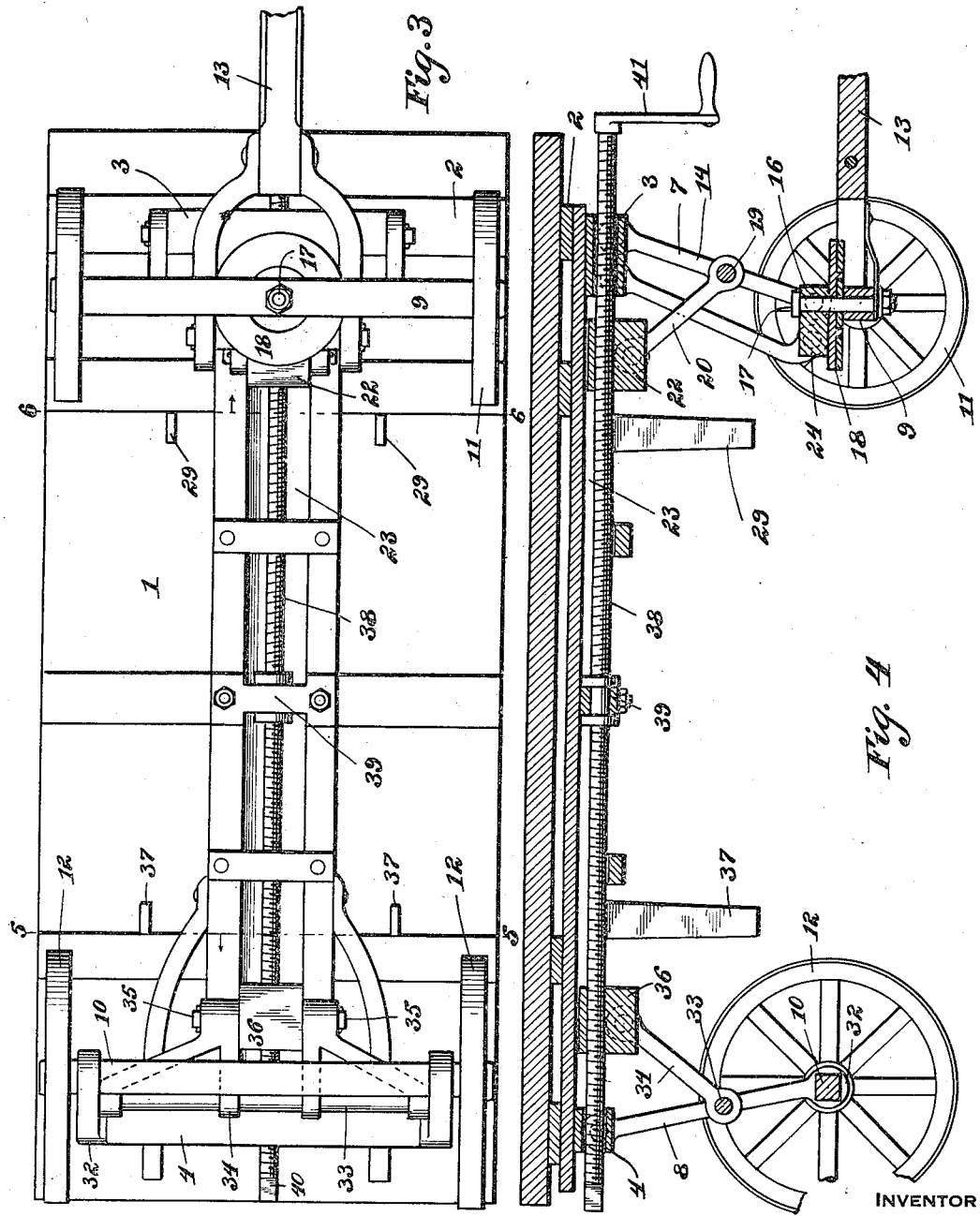

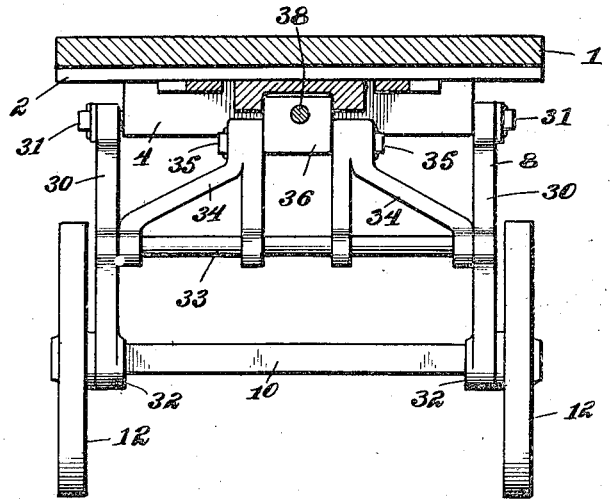
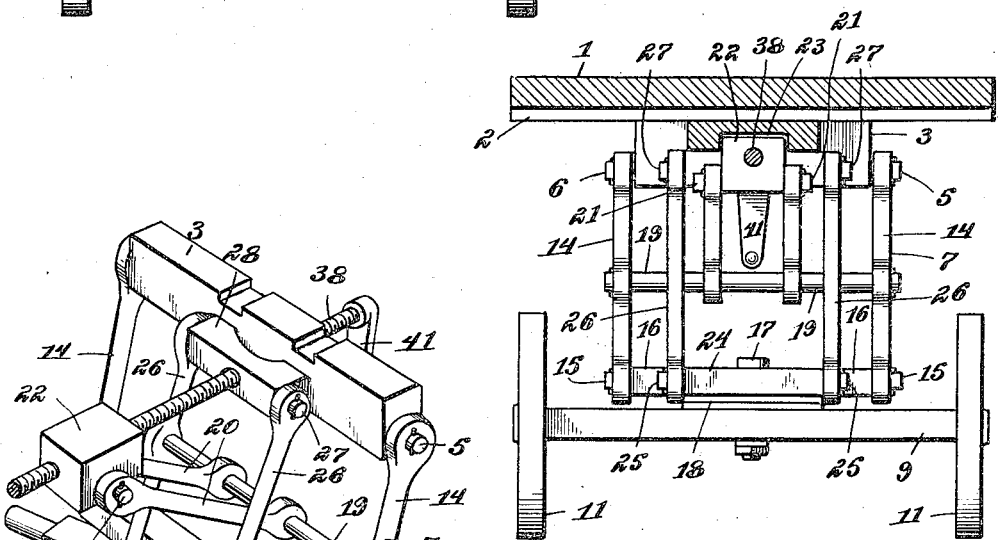
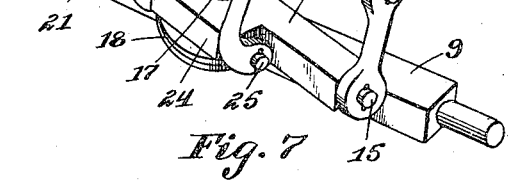

UNITED STATES PATENT OFFICE.

JOHN H. YARBROUGH, OF WOMBLE, ARKANSAS.

BAGGAGE-TRUCK.

1,257,169.  Specification of Letters Patent.  Patented Feb. 19, 1918.

Application filed December 5, 1916. Serial No. 135,194.

*To all whom it may concern:*

Be it known that I, JOHN H. YARBROUGH, a citizen of the United States, residing at Womble, in the county of Montgomery and State of Arkansas, have invented new and useful Improvements in Baggage-Trucks, of which the following is a specification.

This invention relates to improvements in baggage trucks and similar vehicles, the object of the invention being to provide a truck in which provision is made for readily and conveniently adjusting the truck platform or body with relation to the surface of the ground, whereby the height or elevation of the platform or truck body may be varied as circumstances may require, and afford greater conveniences in the use of the truck.

A further object of the invention is to provide a construction whereby the object sought may be gained by adjusting the wheel supporting frames of the truck with relation to the platform or body, such means embodying an adjusting mechanism which is self-locking in all of its positions and preferably operable from either end of the truck, so that the frame supports of both sets of wheels may be simultaneously adjusted.

A still further object of the invention is to provide a construction of adjusting means for the front wheel frame of the truck whereby the usual fifth-wheel may be maintained at all times in a horizontal position within the range of adjustment.

With these and other objects in view the invention consists of the features of construction, combination and arrangement of parts hereinafter fully described and claimed, reference being had to the accompanying drawings in which :—

Figure 1 is a side elevation of a platform truck embodying my invention, showing the platform disposed at its highest elevation.

Fig. 2 is a view similar to Fig. 1 showing the wheel frames adjusted to dispose the truck platforms at a lower elevation.

Fig. 3 is a bottom plan view of the truck.

Fig. 4 is a vertical longitudinal section of the same.

Fig. 5 is a vertical transverse section on the line 5—5 of Fig. 3.

Fig. 6 is a vertical transverse section on the line 6—6 of Fig. 3.

Fig. 7 is a detail view of the front axle and parts of the front wheel carrying the frame associated therewith.

Referring to the drawings, 1 designates the truck body or platform, which is bolted or otherwise suitably attached to a longitudinally extending reach-board or plate 2, to which are fastened front and rear bolsters 3 and 4, which are respectively provided with reduced ends forming axle members or spindles 5 and 6. On these respective axles or spindles 5 and 6 of the bolsters 3 and 4 are pivotally mounted front and rear wheel carrying frames 7 and 8, which support the front and rear axles 9 and 10 on which are respectively journaled the front supporting and steering wheels 11, and the rear supporting wheels 12. A draft bar or other suitable draft attachment 13 is suitably connected with the front axle 9 whereby the truck may be drawn or pushed from place to place in the usual manner.

The front wheel carrier frame 7 comprises a pair of spaced side or link bars 14, having their upper ends pivotally engaging the spindles 5 of the front bolster 3 and their lower ends pivotally engaging spindles 15 at the ends of a lower cross bar 16, which lower cross bar is connected with the front axle 9 by a king bolt 17 and the usual fifth-wheel members 18, adapting said front axle to be readily and conveniently turned for steering purposes. A second cross rod or bar 19 connects the side bars 14 at a point between the lower cross bar 16 and the bolster 3 and is pivotally connected by a pair of draft links 20 with spindles 21 upon a traveler block 22 movable in a grooved guideway 23 in the underside of the reach, whereby in the forward and backward movements of said traveler the front wheel carrier frame will be moved forwardly or rearwardly in an arc to vary the distance between the platform and front axle, and consequently the distance of the platform from the ground, in an obvious manner. Secured to the rear surface of the lower cross bar 16 or constructed to form part thereof is a bracket 24 provided with spindles 25 which are pivotally coupled by limitation or controlling links 26 to spindles 27 on a bracket 28 secured to or forming part of the bolster 3, whereby in the backward and forward movements of the bars 14 the cross bar 16 will be turned upon its spindles to always maintain said bar and the axle 9 in a level or horizontal position, so that the fifth-wheel will be horizontally disposed to adapt the front wheels to suitably support the forward end of the truck and the front axle to be turned with facility; stop bars 29 are disposed so as to be engaged by the lower ends of the side bars 14, when the front wheel carrying frame is swung upwardly and rearwardly to its extreme limit, in order to reinforce the wheel carrying frame and hold it firmly in its position of extreme adjustment to maintain the platform at its lowest level.

The rear wheel carrier frame 8 comprises a pair of side bars or link bars 30 which are pivotally connected at their upper ends with spindles 31 on the rear bolster 4 and are provided at their lower ends with bearings 32 in which the rear axle 10 is journaled. The bars 30 are also connected intermediate of their ends by a cross rod or bar 33, which is pivotally coupled by bracket members 34 to spindles 35 upon the rear traveler 36, movable longitudinally like the front traveler 22 in the grooved guideway 23. By this construction the rear axle and its carrier frame are adapted to be moved longitudinally in an upward and forward or downward and rearward direction to vary the height of the rear end of the truck. Stop bars 37 are provided in the path of movement of the side bars 30 and serve to arrest the wheel carrier frame when adjusted inwardly and upwardly to its extreme position and to steady and brace said frame in such position, to firmly support the rear end of the truck when at its lowest elevation.

For the purpose of adjusting the two wheel carrier frames in unison, a screw shaft 38 is provided which is journaled for rotation in suitable bearings 39 upon the reach 2 and is arranged to extend along the grooved guideway 23. This shaft passes through threaded openings in the travelers 22 and 36, which thus serve the function of nuts and the end portions of said shaft are threaded in opposite directions so that upon rotating said shaft in one direction, both nuts or traveler will be simultaneously moved inwardly or toward each other, while upon rotating the shaft in the opposite direction both nuts or travelers will be simultaneously moved away from each other, whereby the front and rear wheel carrier frames may be simultaneously adjusted to the same degree to raise or lower the front and rear ends of the truck as will be readily understood. The ends of the shaft extend to points in proximity with the ends of the platform and have angular portions 40 to receive a crank handle 41 or other suitable operating device whereby the shaft may be operated for adjusting purposes from either end of the truck.

From the foregoing description, taken in connection with the accompanying drawings, the construction and mode of operation of my improved truck will be readily understood, and it will be seen that the invention provides a truck having a body or platform which may be readily, easily and conveniently adjusted to vary its height with relation to the ground, whereby increased conveniences in the use of the truck are obtained. It will also be seen that this object is gained by mounting the wheel carrier frames for adjusting movements in such a manner as to avoid the use of a complication of parts for the purpose. The advantages of the device will therefore be readily understood and appreciated. It will, of course, be understood that while the screw shaft is adapted to be operated from either end of the truck, it may be constructed for operation at one end only, or by suitable gearing from any other point, and it will be seen that by the construction described the adjusting elements are rendered self-locking, thus obviating the necessity of employing auxiliary fastening means to secure the wheel carrier frames in adjusted position.

I claim:—

1. A truck including a platform, wheel carrier frames pivotally mounted upon said platform and each including supporting axles, a fifth-wheel connection between the front supporting axle and the front carrier frame, said fifth-wheel connection being pivotally coupled to said front carrier frame, controlling links for maintaining said fifth-wheel connection in a horizontal position in the movements of the front wheel carrier frame, travelers slidably connected with the platform and pivotally connected with the wheel carrier frames, and means for simultaneously adjusting said carriers in opposite directions in unison.

2. A truck comprising a body, a screw shaft, stationary nuts connecting said shaft to the body, movable nuts on the shaft, front and rear axles, a set of links connecting the rear axle to a stationary and movable nut at one end of the truck, a fifth wheel connected with the front axle, a beam carried by the fifth wheel, a set of links connecting said beam with the movable and stationary nuts at the front end of the truck, and a second set of links connecting said beam with a part of the truck for maintaining said fifth wheel in a horizontal position in the movements of the parts.

In testimony whereof I affix my signature.

JOHN H. YARBROUGH.